United States Patent [19]

Todokoro et al.

[11] Patent Number: 4,617,799
[45] Date of Patent: Oct. 21, 1986

[54] PLURAL TURBINE INLET PASSAGE TURBO-SUPERCHARGER WITH INLET PASSAGE SHUT-OFF VALVE

[75] Inventors: Tomoo Todokoro; Haruo Okimoto; Ikuo Matsuda, all of Hiroshima, Japan

[73] Assignee: Mazda Motor Corporation, Hiroshima, Japan

[21] Appl. No.: 681,829

[22] Filed: Dec. 14, 1984

[30] Foreign Application Priority Data

Dec. 16, 1983 [JP] Japan .................. 58-238398

[51] Int. Cl.[4] .................. F02B 37/12; F01D 17/14; F01D 17/18
[52] U.S. Cl. .................. 60/602; 415/29; 415/151
[58] Field of Search .................. 60/600, 601, 602, 603; 415/28, 29, 151, 205

[56] References Cited

U.S. PATENT DOCUMENTS

| 3,557,549 | 1/1971 | Webster .................. 60/602 |
| 4,008,572 | 2/1977 | Weollenweber, Jr. .................. 60/602 |
| 4,389,845 | 6/1983 | Koike .................. 415/205 X |
| 4,443,153 | 4/1984 | Dibelius .................. 415/151 |
| 4,463,564 | 8/1984 | McInerney .................. 60/602 |
| 4,512,714 | 4/1985 | Kaesser .................. 415/151 |

FOREIGN PATENT DOCUMENTS

| 1253510 | 11/1967 | Fed. Rep. of Germany ........ 60/602 |
| 2558878 | 7/1977 | Fed. Rep. of Germany ........ 60/602 |
| 3008180 | 9/1981 | Fed. Rep. of Germany ........ 60/602 |
| 50-8306 | 1/1975 | Japan .................. 60/602 |
| 0113015 | 9/1981 | Japan .................. 60/602 |
| 58-18522 | 2/1983 | Japan .................. 60/602 |
| 0079622 | 5/1983 | Japan .................. 60/602 |
| 0172427 | 10/1983 | Japan .................. 60/602 |

Primary Examiner—Michael Koczo
Assistant Examiner—Randolph A. Smith
Attorney, Agent, or Firm—Fleit, Jacobson, Cohn & Price

[57] ABSTRACT

A turbo-supercharger for an engine includes a turbine casing having a turbine scroll divided into a first and second inlet passages. The inlet passages are opened to the engine exhaust passage through first and second inlet ports formed in a mating surface where the turbine casing is attached to the exhaust passage. A shut-off valve is provided in the exhaust passage and has a valve member which is adapted to be seated on the mating surface to close the second inlet port to thereby allow the exhaust gas to flow only through the first inlet passage. The shut-off valve is opened under high speed, heavy load operation so that the exhaust gas is passed through both the first and second inlet passages. A bypass passage is provided in the turbine casing to open at one end to the first inlet passage. A waste gate valve is provided to open the bypass passage when the supercharging pressure exceeds a predetermined value.

9 Claims, 4 Drawing Figures

PLURAL TURBINE INLET PASSAGE TURBO-SUPERCHARGER WITH INLET PASSAGE SHUT-OFF VALVE

BACKGROUND OF THE INVENTION

1. Field of the Invention

The present invention relates to an internal combustion engine and more particularly to a turbo-supercharger for internal combustion engines.

2. Description of Prior Art

A turbo-supercharger for internal combustion engines includes a turbine located in the engine exhaust system for driving a supercharging compressor which is located in the engine intake system. The turbine is driven by the stream of exhaust gas so as to recover the waste energy in the exhaust gas. Where the turbo-supercharger is employed in an automobile engine, problems arise because the automobile engine is operated throughout a wide output range, that is, from idling operation to high power operation. Under medium load operation, as well as at high speed, heavy load operation, there is a substantial exhaust gas flow, so that adequate driving energy is available to the turbine. However, under light load engine operation, the exhaust gas flow is not sufficient to drive the turbine so that the turbine simply produces a drag to the exhaust gas flow without any contribution to the engine output.

In order to eliminate the above problems, it has been proposed to divide the scroll of the turbine casing into two parallel passages and provide a shut-off valve in one of the passages so that only the other passage is used to allow the exhaust gas to pass therethrough under light load engine operation. For example, in Japanese patent application No. 56-116426 filed on July 17, 1981 and disclosed for public inspection on Feb. 3, 1983 under the disclosure No. 58-18522, there is disclosed a turbo-supercharger including a turbine scroll provided with a substantially radially inwardly extending partition wall dividing the interior of the scroll into a main passage of a relatively small crosssectional area and an auxiliary passage of a relatively large cross-sectional area. The auxiliary passage communicates at the upstream end with the main passage through an opening formed in a wall of the main passage. In the opening of the wall, there is provided a shut-off valve which is closed under low speed, light load engine operation. Thus, under low speed, light load operation the exhaust gas is passed only through the main passage. Since the main passage is of a relatively small cross-sectional area, the speed of the exhaust gas flow is increased to thereby increase the turbine speed even under a small exhaust gas flow. In medium and heavy load operations, the shut-off valve is opened and the exhaust gas is allowed to pass through the main and auxiliary passages. It is therefore possible to prevent the speed of the exhaust gas flow from being increased excessively. In the turbo-supercharger proposed by the aforementioned Japanese Patent application, there is further provided a turbine bypass valve for bypassing a part of the exhaust gas around the turbine where an over-charging is likely to occur. The bypass valve is located in the turbine scroll at a wall of the main passage.

The turbo-supercharger proposed by the aforementioned Japanese patent application is considered to solve to some extent the problems inherent to the supercharger for automobile engines, because the turbine speed can be increased under low speed, light load engine operation. It should, however, be noted that since the upstream end of the auxiliary passage is opened to the main passage through the opening in the wall of the main passage, the exhaust gas flow cannot effectively be directed to the auxiliary passage even when the shut-off valve is opened and the overall drag to the exhaust gas flow is increased under heavy load operation. Further, the proposed structure is considered disadvantageous in that the shut-off valve and the bypass valve must be provided in the turbine casing casing so that the turbine becomes structurally complicated.

OBJECT OF THE INVENTION

It is therefore an object of the present invention to provide a turbo-supercharger having a turbine scroll divided into two parallel passages but the shut-off valve for closing one of the passages is not located in the turbine casing.

Another object of the present invention is to provide a turbo-supercharger having a turbine scroll divided into two parallel passages, in which the exhaust gas flow can be directed into either of the passages without substantially changing its direction.

A further object of the present invention is to provide a turbo-supercharger which can provide a supercharging effect even under light load engine operation, but nevertheless has a relatively simple turbine casing.

SUMMARY OF THE INVENTION

According to the present invention, the above and other objects can be accomplished by a turbo-supercharger for an engine comprising a supercharging compressor located in an intake system of the engine and a turbine located in an exhaust system of the engine, said turbine including a turbine casing connected with an exhaust passage of the engine and a turbine rotor rotatably mounted in said turbine casing and connected with the compressor, said turbine casing including exhaust gas inlet passage means for directing exhaust gas flow from the exhaust passage to the turbine rotor, said inlet passage means including mutually separated parallel first and second inlet passages, said first and second inlet passages being opened to said exhaust passage respectively through a first and second inlet ports, and a shut-off valve is provided in said exhaust passage for engagement with said second inlet port. A bypass passage may be formed in the turbine casing and may have an upstream end opened to said first passage. A bypass valve may then be provided on the turbine casing for normally closing the bypass passage, but opening it when the supercharging pressure exceeds a predetermined value. Preferably, the second inlet port is arranged substantially perpendicularly to the exhaust gas flow in the exhaust passage so that the exhaust gas is allowed to flow into the second inlet passage without changing the direction of the flow when the shut-off valve is opened. The first and second inlet ports may be formed in the turbine casing at the mating surface which is adapted to be attached to the exhaust passage.

The above and other objects and features of the present invention will become apparent from the following description of a preferred embodiment taking reference to the accompanying drawings.

DESCRIPTION OF THE PREFERRED EMBODIMENT

Figure 1:
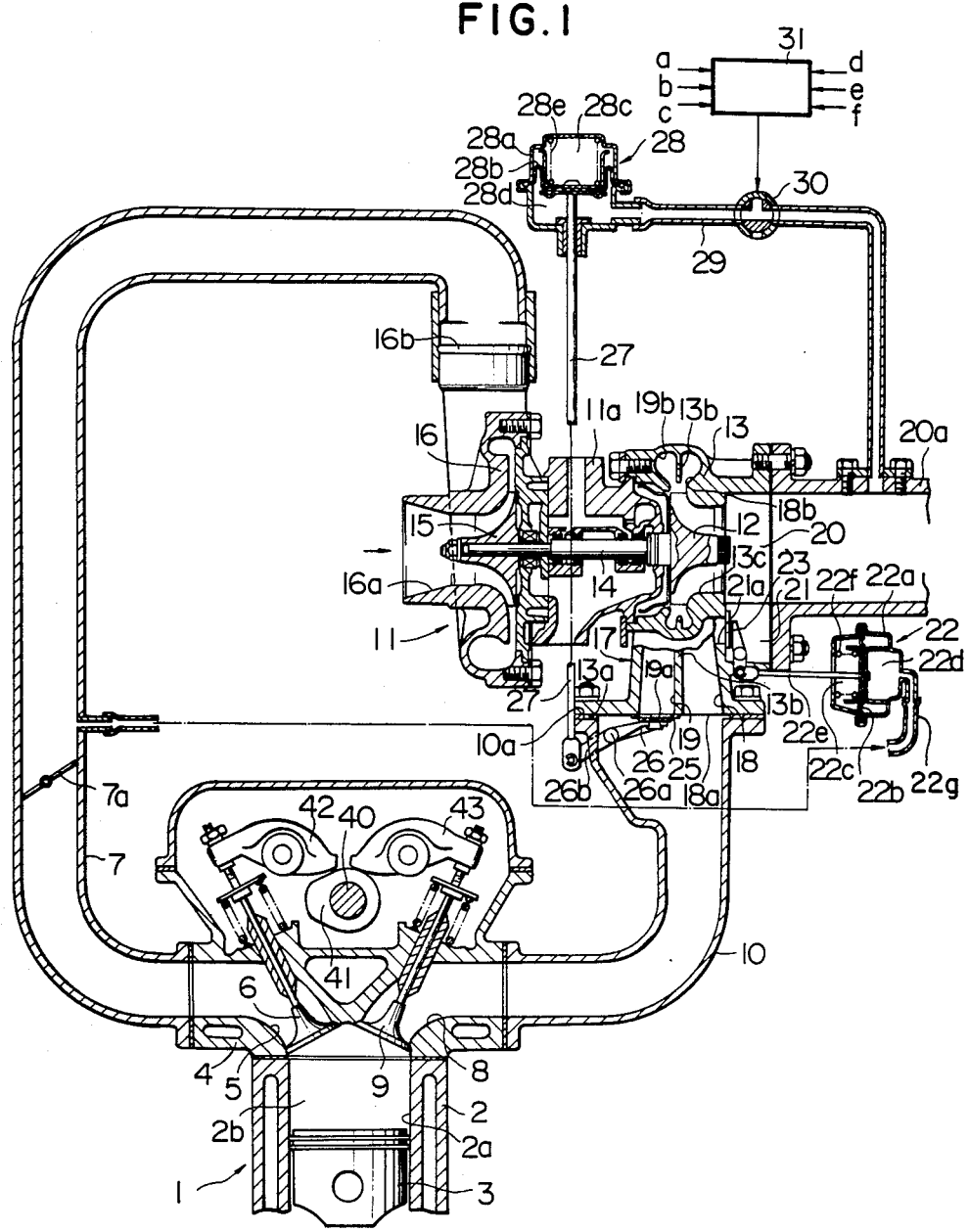
FIG. 1 is a sectional view of an internal combustion engine having a turbo-supercharger in accordance with one embodiment of the present invention.
Figure 2:
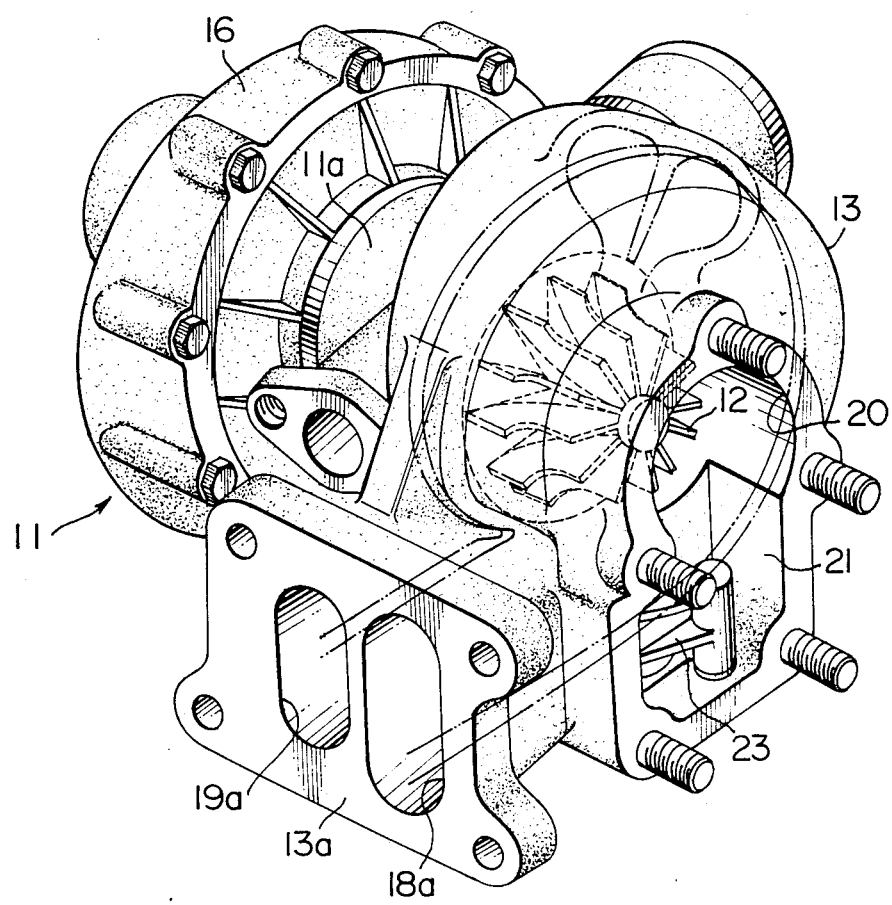
FIG. 2 is a perspective view of the turbo-supercharger shown in FIG. 1.

Referring to the drawings, and particularly to FIG. 1, there is shown an engine 1 including a cylinder block 2 formed with a cylinder bore 2a, and a cylinder head 4 attached to the cylinder block 2 to define a combustion chamber 2b. In the cylinder bore 2a, there is disposed for reciprocating movement a piston 3 which is connected through a connecting rod (not shown) with a crankshaft, as is well known in the art. In the cylinder head 4, there is formed an intake port 5 which is provided with an intake valve 6 and connected with an intake passage 7. The cylinder head 4 further has an exhaust port 8 which is associated with an exhaust valve 9. The exhaust port 8 is connected with an exhaust passage 10. In the cylinder head 4, there is a cam shaft 40 having a plurality of valve actuating cams 41 (only one is shown in FIG. 1). An intake rocker arm 42 is provided so that it is actuated by one of the cams 41 and actuates the intake valve 6, as is well known in the art. Similarly, an exhaust rocker arm 43 is provided for cooperation with another cam 41 to thereby actuate the exhaust valve 9.

The intake passage 7 is provided with a throttle valve 7a and there is downstream of the throttle valve 7a a fuel injection nozzle, although not shown in FIG. 1.

The engine shown in FIG. 1 has turbo-supercharger 11 which includes a turbine rotor 12 housed in a turbine casing 13 and a compressor rotor 15 housed in a compressor casing 16. The casings 13 and 16 are connected together by a center casing 11a. A turbine shaft 14 connects the turbine rotor 12 with the compressor rotor 15 and is rotatably supported by the center casing 11a. The turbine casing 13 is connected with the downstream end of the exhaust passage 10. For that purpose, the exhaust passage 10 is formed at the downstream end with a mating surface 10a, and the turbine casing 13 is formed with a mating surface 13a which is attached to the mating surface 10a through a suitable gasket. The compressor casing 16 includes an air inlet port 16a and an air outlet 16b which is connected with the intake passage 7.

The turbine casing 13 has inlet passage means 17 comprised of a first inlet passage 18 and a second inlet passage 19, which are separated from each other by a partition wall 13b. The first inlet passage 18 is opened to the exhaust passage 10 through an inlet port 18a formed in the mating surface 13a. Similarly, the second inlet passage 19 is opened to the exhaust passage 10 through an inlet port 19a formed in the mating surface 13a. The inlet passages 18 and 19 have turbine scrolls 18b and 19b, respectively, for directing the exhaust gas from the exhaust passage 10 tangentially to the turbine rotor 12. The turbine casing 13 is further formed with a gas outlet 13c which leads to a gas outlet chamber 20 connected with an exhaust pipe 20a.

The first inlet passage 18 is formed at the wall thereof with a bypass port 21a which opens the passage 18 to a bypass passage 21 formed in the turbine casing 13. The bypass 21 is communicated with the gas outlet chamber 20 for bypassing the turbine rotor 12. For controlling the bypass port 21a, there is provided a waste gate valve 23 which is actuated by a pneumatic actuator 22. The actuator 22 has a casing 22a and a diaphragm 22b separating the interior of the casing 22a into an atmospheric pressure chamber 22c and an intake pressure chamber 22d. The diaphragm 22b is connected with a rod 22e which is in turn connected with the valve 23. In the chamber 22c, there is a spring 22f which forces the diaphragm 22b to the right, as shown to thereby bias the valve 23 to the closed position. The chamber 22d is connected through a conduit 22g with the intake passage 7 upstream of the throttle valve 7a. It will therefore be understood that when the pressure in the intake passage 7 upstream of the throttle valve 7a increases beyond a predetermined value, the actuator 22 functions to actuate the valve 23 to the open position.

At the downstream end portion of the exhaust passage 10, there is provided a shut-off valve 25 for closing the second inlet port 19a of the second inlet passage 19. The a shut-off valve 25 is connected to one end of a valve actuating lever 26, which is pivotably mounted at the other end on the exhaust passage 10 through a pivot shaft 26a. The pivot shaft 26a extends outside the exhaust passage 10 and a second valve actuating lever 26b is a secured at one end to the pivot shaft 26a. The other end of the lever 26b is connected with one end of a valve actuating rod 27, which is in turn connected at the other end with a valve actuator 28. The valve actuator 28 has a valve casing 28a and a diaphragm 28b which divides the interior of the casing 28a into an atmospheric pressure chamber 28c and an exhaust gas pressure chamber 28d. The diaphragm 28b is connected with the rod 27. In the chamber 28c, there is a spring 28e which forces the diaphragm 28b downward, as shown to thereby bias the valve 25 to the closed position. The chamber 28d is connected through a conduit 29 with the exhaust pipe 20a so that the exhaust gas pressure is introduced into the chamber 28d. In the conduit 29, there is a solenoid type three-way valve 30 which is controlled by a signal applied thereto from a control unit 31, which may be a microprocessor. The control unit 31 receives an engine cooling water temperature signal a, a supercharging pressure signal b representing the pressure in the intake passage 7 upstream of the throttle valve 7a, an engine speed signal c, an engine knocking signal d, an exhaust gas temperature signal e representing the temperature of the exhaust gas in the exhaust passage 10 or in the exhaust pipe 20a, and a throttle valve position signal f. The control unit 31 produces an output to energize the solenoid valve 30 to thereby connect the chamber 28d to the exhaust pipe 20a when the engine speed is above a predetermined value and the throttle valve 7a is opened beyond a predetermined position, as long as the engine temperature is above a predetermined value, the supercharging pressure is within an allowable limit, the engine knocking signal is not produced and the exhaust gas temperature is below an allowable limit. Thus, the conduit 29 is opened when the engine operating condition is within the shadowed region S in FIG. 4.

Figure 3:
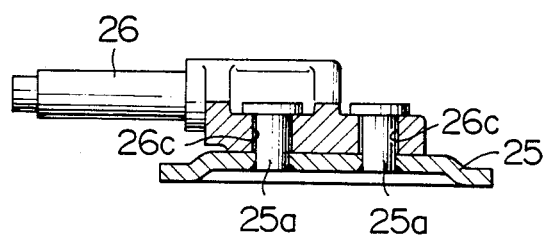
FIG. 3 is a sectional view of the shut-off valve employed in the turbo-supercharger shown in FIGS. 1 and 2; and, FIG. 4 is a diagram showing the engine operating region wherein the shut-off valve is opened.

Referring to FIG. 3, it will be noted that the shutoff valve 25 is connected to the lever 26 by means of a pair of mounting pins 25a. The pins 25a are secured to the valve 25 and inserted loosely into pin holes 26c in the lever 26. With this floating connection of the valve 25 to the lever 26, it is possible to have the valve 25 seated on the mating surface 13a of the turbine casing 13 even when there are certain degrees of manufacturing errors and thermal deformations.

In operation, where the engine throttle valve opening is smaller than a predetermined value and/or the engine speed is lower than a predetermined value, the solenoid valve 30 is de-energized to disconnect the chamber 28d from the exhaust pipe 20a and open the chamber 28d to the atmosphere. Thus, the valve 25 is closed so that the exhaust gas is forced to flow only through the first inlet passage 18. Since the passage 18 is of a relatively small cross-sectional area, the speed of the exhaust gas flow can be increased so that a sufficient driving torque is applied to the turbine rotor 12. When the supercharging pressure increases under this operating condition beyond an allowable limit, the actuator 22 functions to open the waste gate valve 23 so that a part of the exhaust gas in the first inlet passage 18 is allowed to flow through the bypass passage 21.

Figure 4:
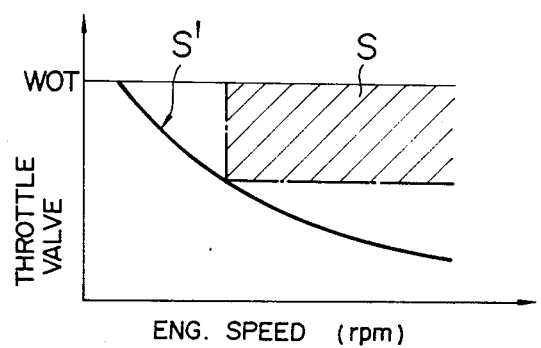

Under an engine operating condition in the region S shown in FIG. 4, the solenoid valve 30 is energized to connect the chamber 28d to the exhaust pipe 20a. At this time, the exhaust gas pressure is sufficient to displace the diaphragm 28b in the actuator 28 against the influence of the spring 28e so that the valve 25 is opened to allow the exhaust gas to flow through the second inlet passage 19 for high power operation. The illustrated arrangement is advantageous because the inlet ports 18a and 19a are formed in the mating surface 13a on the turbine casing 13 so that the exhaust gas is directed into the inlet passages 18 and 19 without changing its direction of flow. Further, since the shut-off valve 25 is provided in the exhaust passage 10 but not in the turbine casing 13, the structure of the turbine casing 13 can be simplified. It is preferable to located the bypass port 21a in the first inlet port 18 because the exhaust gas flow in the first inlet passage 18 is relatively small so that it is possible to minimize the dampening effect on the pulsations in the exhaust gas flow when the waste gate valve 23 is opened.

The solenoid valve 30 in the conduit 29 may be omitted and the chamber 28d in the actuator 28 may always be connected with the exhaust pipe 20a. In this arrangement, the shut-off valve 25 is opened in the region above the line S' in FIG. 4.

The invention has thus been shown and described with reference to a specific embodiment, however, it should be noted that the invention is in no way limited to the details of the illustrated structures, but changes and modifications may be made without departing from the scope of the appended claims.

What is claimed is:

1. A turbo-supercharger for an engine comprising a supercharging compressor located in an intake system of the engine and a turbine located in an exhaust system of the engine, said turbine including a turbine casing having a substantially planar surface which is connected with an exhaust passage of the engine and a turbine rotor rotatably mounted in said turbine casing and connected with the compressor, said turbine casing including exhaust gas inlet passage means for directing exhaust gas flow from the exhaust passage to the turbine rotor, said inlet passage means including mutually separated parallel first and second inlet passages, said first and second inlet passages being opened to said exhaust passage respectively through first and second inlet ports formed in said mating surface and surrounded by said exhaust passage, a shut-off valve provided in said exhaust passage and having a valve member adapted to be seated on said planar surface around said second inlet port to totally close the second inlet port.

2. A turbo-supercharger for an engine comprising a supercharging compressor located in an intake system of the engine and a turbine located in an exhaust system of the engine, said exhaust system including an exhaust passage extending from the engine, said turbine including a turbine casing connected with said exhaust passage of the engine and a turbine rotor rotatably mounted in said turbine casing and connected with the compressor, said turbine casing including an inlet end surface adapted to be connected with the exhaust passage of the engine and formed with exhaust gas inlet passage means opening to said inlet end surface for directing exhaust gas flow from the exhaust passage to the turbine rotor, said inlet passage means including mutually separated parallel first and second inlet passages, which respectively have first and second inlet ports defining respective openings at said inlet end surface, said inlet passages extending in a direction of exhaust gas flow in the exhaust passage, a shut-off valve for closing said second inlet port, said shut-off valve including a valve member carried by a lever pivotably carried on said exhaust passage so that the valve member is moved upon swingable movements of the pivotable lever between a closed position wherein the valve member is seated on the inlet end surface to cover the entire periphery of said second inlet port, and an open position wherein the valve member is positioned away from the inlet end surface.

3. A turbo-supercharger in accordance with claim 2 which includes a bypass passage opening to the first inlet passage and a bypass valve provided in said bypass passage means for opening the bypass passage when a supercharging pressure exceeds a predetermined value.

4. A turbo-supercharger in accordance with claim 2 which includes valve actuating means for opening said shut-off valve at least under a high speed heavy load engine operation.

5. A turbo-supercharger in accordance with claim 4 in which said actuating means is responsive to an exhaust gas pressure to open the shut-off valve when the exhaust gas pressure exceeds a predetermined value.

6. A turbo-supercharger in accordance with claim 2 in which said valve member is connected with the pivotable lever through a floating connection which allows a certain degree of movement of the valve member with respect to the lever.

7. A turbo-supercharger for an engine comprising a supercharging compressor located in an intake system of the engine and a turbine located in an exhaust system of the engine, said turbine including a turbine casing connected with an exhaust passage of the engine and a turbine rotor rotatably mounted in said turbine casing and connected with the compressor, said turbine casing including exhaust gas inlet passage means for directing exhaust gas flow from the exhaust passage to the turbine rotor, said inlet passage means including first and second inlet passages which are separated from each other by a partition wall extending in the direction of exhaust gas flow, said first and second inlet passages being opened to said exhaust passage respectively through first and second inlet ports, opening toward an upstream side of said casing, a shut-off valve for closing said second inlet port, said shut-off valve including a valve member carried pivotably on said exhaust passage upstream of said turbine for movement between a closed position wherein the valve member closes the second inlet port formed in the turbine casing by being seated on an overall periphery of said second inlet port, and an open position wherein the valve member is moved away from the second inlet port, a bypass passage opening to a wall of the first inlet passage and leading to the exhaust passage downstream of the turbine, a bypass valve provided in said bypass passage for opening the bypass passage when pressure in said engine intake system exceeds a predetermined value.

8. A turbo-supercharger in accordance with claim 7 in which said first and second inlet ports are formed in a mating surface of the turbine casing which is attached to the exhaust passage, said valve member of said shut-off valve being adapted to be seated on the mating surface of the turbine casing to close the second inlet port.

9. A turbo-supercharger in accordance with claim 8 in which said valve member is connected with a valve actuating lever by means of a floating connection which allows a certain degree of movement of the valve member with respect to the lever.

* * * * *